United States Patent
Jung

(10) Patent No.: US 9,831,513 B2
(45) Date of Patent: Nov. 28, 2017

(54) FUEL CELL STACK AND CONTROL METHOD THEREOF

(71) Applicant: Hyundai Motor Company, Seoul (KR)

(72) Inventor: Jae Won Jung, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 469 days.

(21) Appl. No.: 14/290,798

(22) Filed: May 29, 2014

(65) Prior Publication Data

US 2015/0155577 A1 Jun. 4, 2015

(30) Foreign Application Priority Data

Nov. 29, 2013 (KR) .................. 10-2013-0147276

(51) Int. Cl.
| | |
|---|---|
| H01M 8/04 | (2016.01) |
| H01M 8/04746 | (2016.01) |
| H01M 8/04537 | (2016.01) |
| H01M 8/0438 | (2016.01) |
| B60L 11/18 | (2006.01) |
| H01M 8/04992 | (2016.01) |
| H01M 16/00 | (2006.01) |
| H01M 8/04082 | (2016.01) |

(52) U.S. Cl.
CPC ..... *H01M 8/04753* (2013.01); *B60L 11/1881* (2013.01); *H01M 8/04395* (2013.01); *H01M 8/04589* (2013.01); *H01M 8/04201* (2013.01); *H01M 8/04992* (2013.01); *H01M 16/006* (2013.01); *H01M 2250/20* (2013.01); *Y02T 90/32* (2013.01); *Y02T 90/34* (2013.01)

(58) Field of Classification Search
CPC ......... H01M 8/04753; H01M 8/04589; H01M 8/04992; H01M 8/04395; H01M 8/04201

USPC ................................... 429/431, 444
See application file for complete search history.

(56) References Cited

U.S. PATENT DOCUMENTS

| | | | |
|---|---|---|---|
| 2002/0022161 A1* | 2/2002 | Kurosaki | H01M 8/04104 429/446 |
| 2002/0045080 A1* | 4/2002 | Andou | H01M 8/04089 429/423 |
| 2012/0088170 A1* | 4/2012 | Heo | H01M 8/04955 429/428 |

FOREIGN PATENT DOCUMENTS

| | | |
|---|---|---|
| JP | 2004-296374 A | 10/2004 |
| JP | 2004-327317 A | 11/2004 |
| KR | 10-2004-0000725 A | 1/2004 |
| KR | 10-2011-0054966 A | 5/2011 |
| KR | 10-20110054966 * | 5/2011 ............. H01M 8/04 |

OTHER PUBLICATIONS

Office Action Korean Patent Application No. 10-2013-0147276 dated Mar. 23, 2015.

* cited by examiner

*Primary Examiner* — Osei Amponsah
(74) *Attorney, Agent, or Firm* — McDermott Will & Emery LLP

(57) ABSTRACT

A fuel cell system includes a fuel cell stack configured to include a cathode and an anode, an air supplier configured to supply air to the cathode, and an air intake pipe configured to connect an outlet of the air supplier and an inlet of the cathode to each other and having an opening adjustable valve provided thereto. A controller is configured to adjust an opening of the valve according to a supplied amount of air to control a flow rate of air supplied to the cathode. Thereby, the fuel cell stack is prevented from drying-out, and durability of a fuel cell is improved.

4 Claims, 6 Drawing Sheets

[FIG.1]
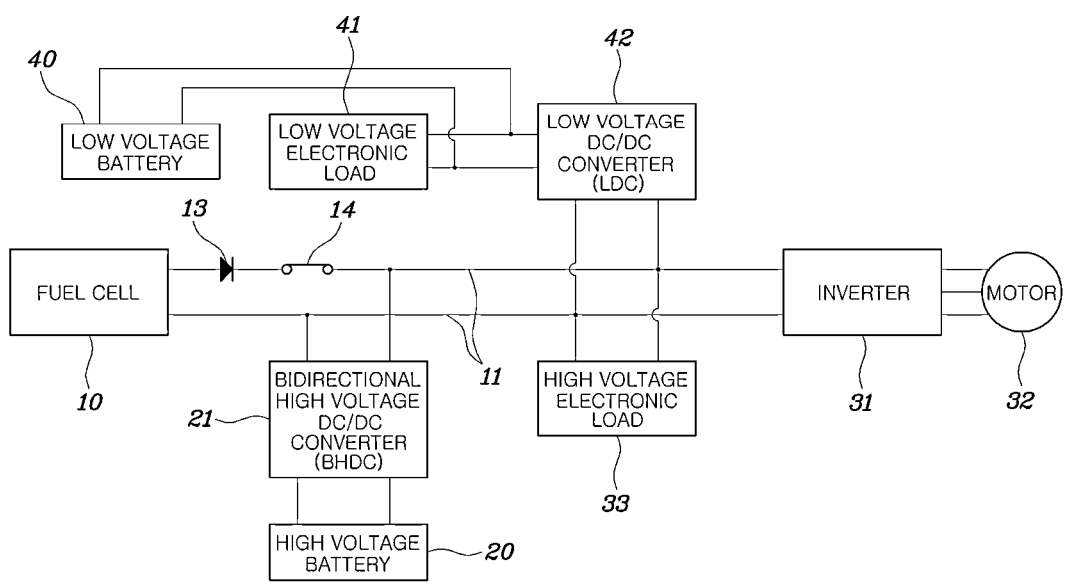

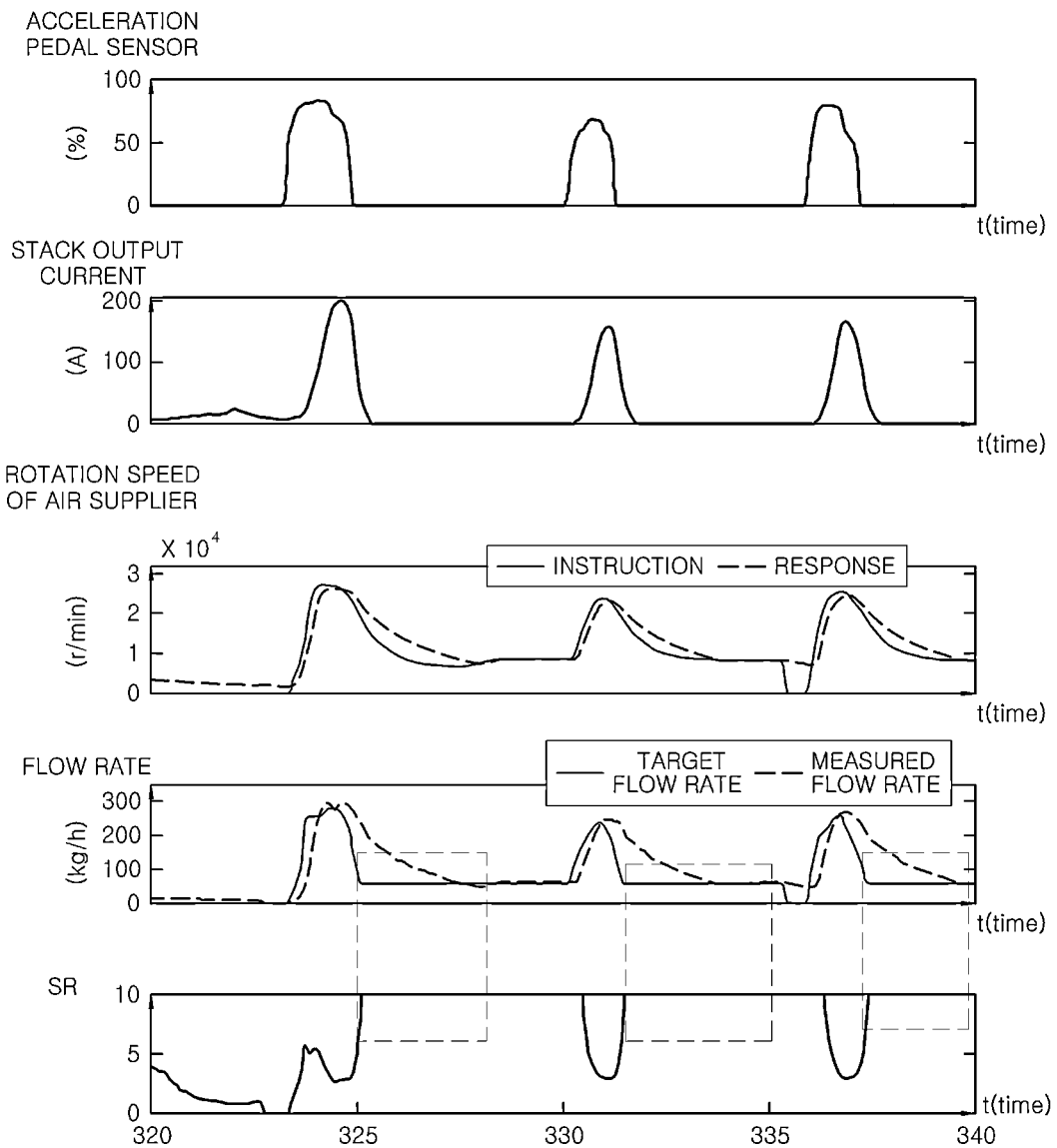
[FIG.2]

[FIG.3]
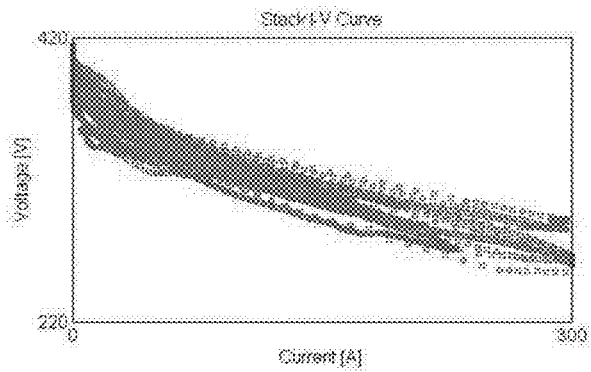
[FIG.4]
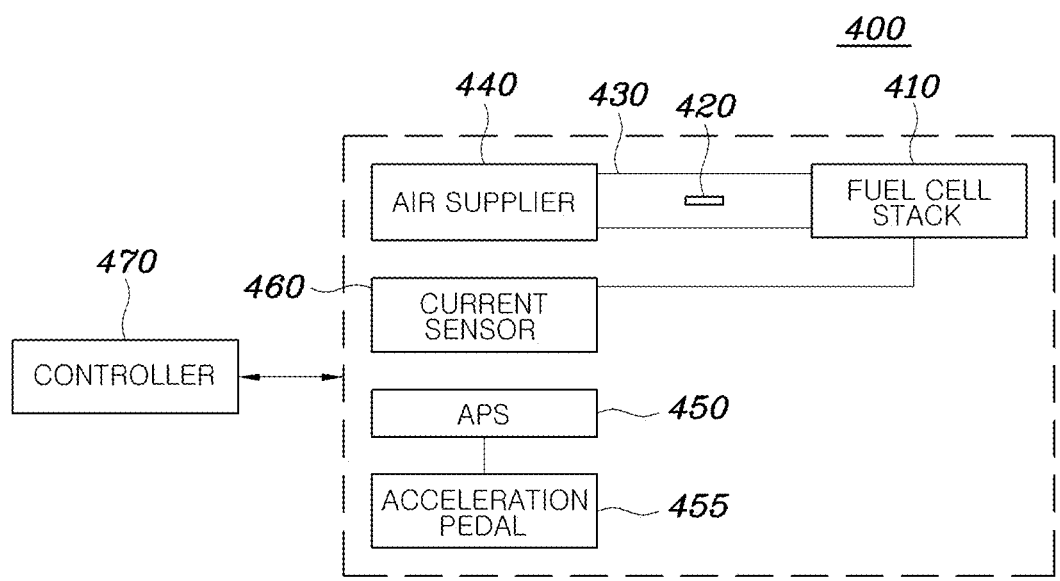

[FIG.5]
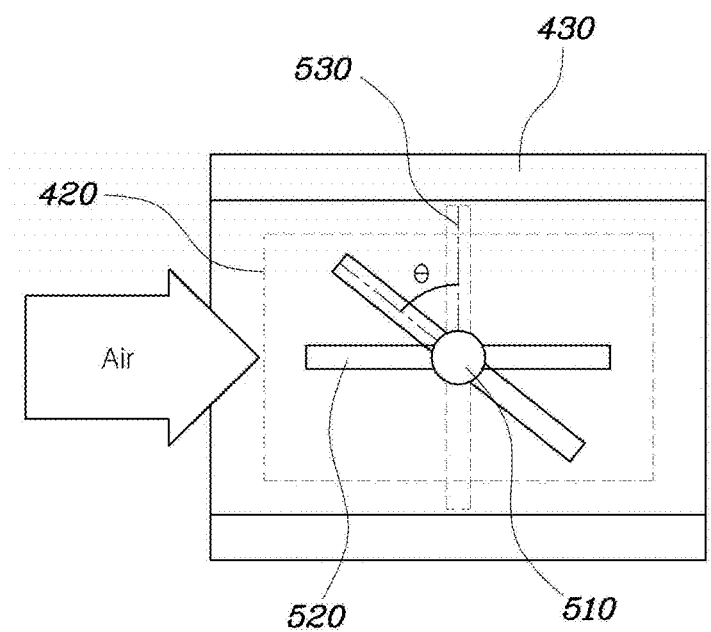

[FIG.6]
ACCELERATION PEDAL SENSOR
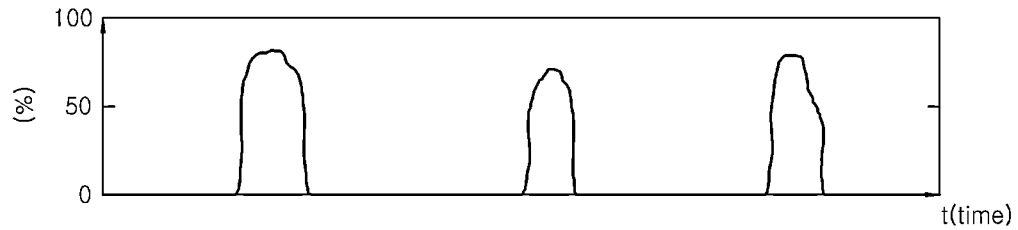
VALVE ANGLE OF AIR INTAKE
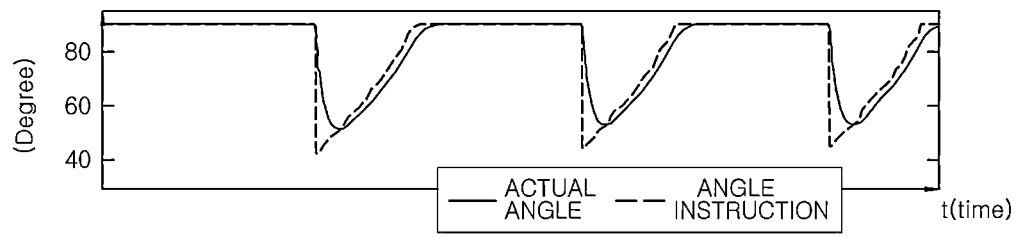
AIR FLOW RATE
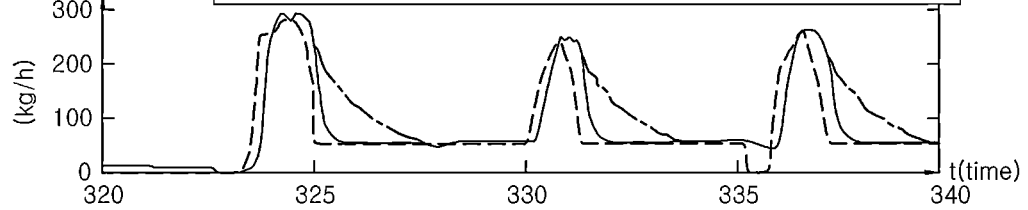

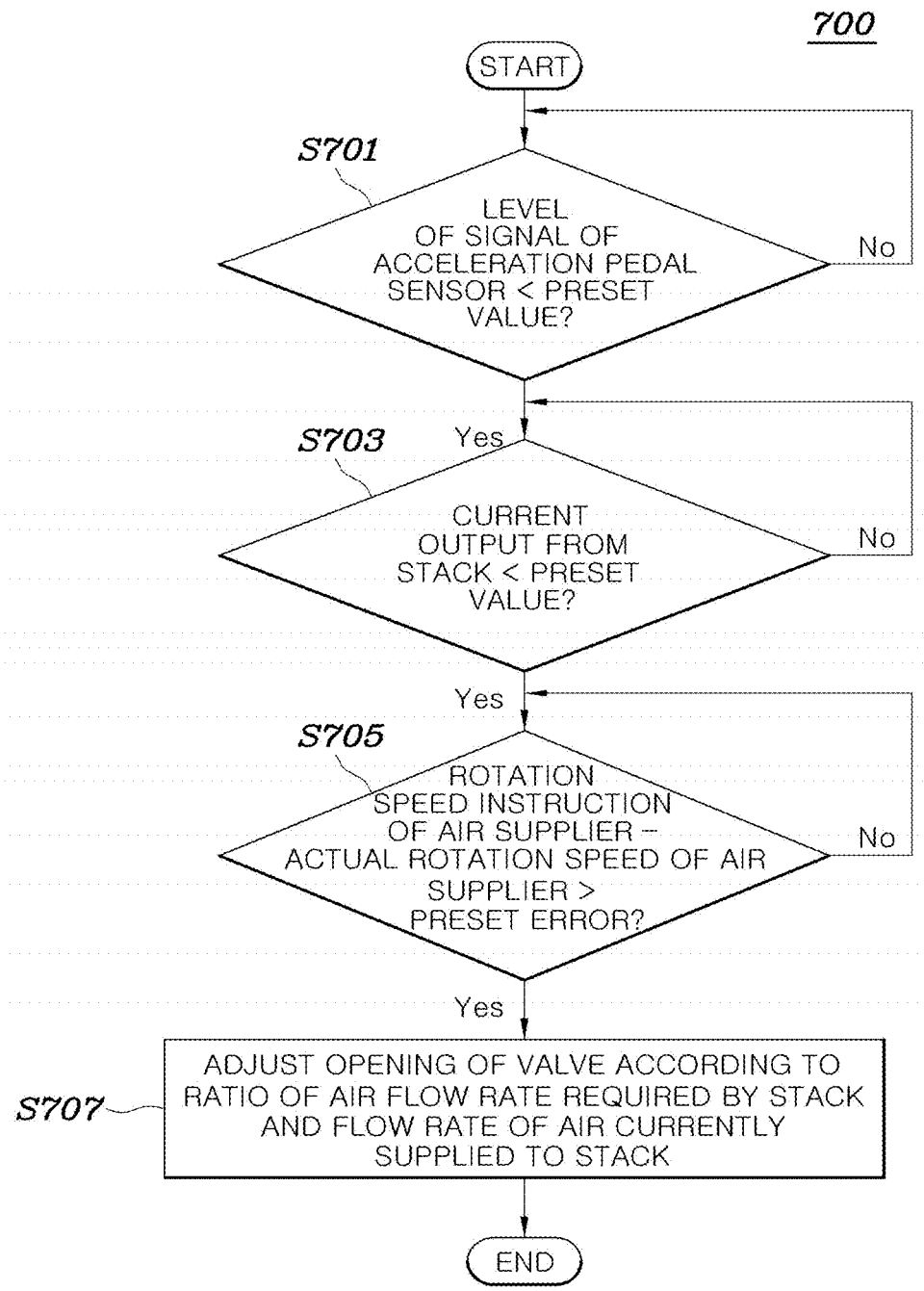

FUEL CELL STACK AND CONTROL METHOD THEREOF

CROSS REFERENCE TO RELATED APPLICATION

The present application claims the benefit of priority to Korean Patent Application Number 10-2013-0147276 filed on Nov. 29, 2013, the entire contents of which is incorporated herein for all purposes by this reference.

TECHNICAL FIELD

The present disclosure relates to a fuel cell stack and a control method thereof, and more particularly, to a fuel cell stack capable of improving durability of a fuel cell and a control method thereof.

BACKGROUND

A fuel cell vehicle includes a fuel cell stack in which a plurality of fuel cells used as a power source are stacked and a fuel supplier supplying hydrogen or the like, which is fuel, to the fuel cell stack. An air supplier supplies oxygen which is an oxidizing agent necessary for an electrochemical reaction. Water and heat manager controls a temperature of the fuel cell stack.

The fuel supplier depressurizes compressed hydrogen in a hydrogen tank and supplies it to an anode of the stack, and the air supplier supplies external air inhaled by actuating an air blower to a cathode of the stack.

When hydrogen is supplied to the anode, and oxygen is supplied to the cathode, hydrogen ions are separated from the anode by a catalyst reaction. The separated hydrogen ions are transferred to the cathode which is an air electrode through an electrolyte membrane. The hydrogen ions separated from the anode, electrons, and oxygen are electrochemically reacted together at the cathode, thereby generating electrical energy. Specifically, electrochemical oxidation of hydrogen is generated from the anode, and electrochemical reduction of oxygen is generated from the cathode. Due to the movement of electrons generated in this case, electricity and heat are generated, and due to the chemical operation in which hydrogen and oxygen are bonded, vapor or water is generated.

A discharging apparatus is provided for discharging by-products, such as vapor, water, and heat generated during a process of generating the electrical energy of the fuel cell stack, and un-reacted hydrogen, oxygen, and the like, and gases such as vapor, hydrogen, and oxygen are discharged to the atmosphere through an exhaust passage.

An air blower, a hydrogen recycle blower, a water pump, and the like for driving the fuel cell are connected to a main bus terminal to facilitate a start of the fuel cell. The main bus terminal may be connected to various relays for facilitating power blocking and connection and a diode preventing a flow of a reverse current into the fuel cell.

Dry air supplied through the air blower is humidified by a humidifier and then supplied to the cathode of the fuel cell stack. An exhaust gas of the cathode may be transferred to the humidifier in a humidified state by water component generated therein to humidify the dry air to be supplied to the cathode.

At the time of tip-out or deceleration of the fuel cell vehicle, a driving motor becomes a low load/no load state or a regenerative braking state, thereby using a little driving current or no driving current. Due to a slow response speed of the air blower, the driving motor is in a temporarily infinite air supercharging state, such that the fuel cell stack may dry out.

SUMMARY

An aspect of the present disclosure provides a fuel cell system capable of adjusting air supplied to a fuel cell stack at the time of a stop of fuel cell electricity generation and a control method thereof.

According to an exemplary embodiment of the present disclosure, a fuel cell system, includes a fuel cell stack including a cathode and an anode. An air supplier supplies air to the cathode. An air intake pipe connects an outlet of the air supplier and an inlet of the cathode to each other and has an opening adjustable valve provided thereto. A controller adjusts an opening of the valve according to a supplied amount of air to thereby control a flow rate of air supplied to the cathode.

The controller may adjust the opening of the valve according to a ratio of a target air flow rate required by the fuel cell stack and an air flow rate currently supplied to the fuel cell stack.

The controller may adjust the opening of the valve to thereby control the flow rate of the supplied air in the case in which a level of the operating signal and a level of a current output from the fuel cell stack are lower than a preset value, and an error between a rotation speed instruction value for the air supplier and an actual rotation speed corresponding to the instruction value is larger than a preset error.

The valve may include a plurality of arms rotating based on a shaft, and the controlling unit may rotate the shaft to thereby adjust the opening of the valve through the plurality of arms.

The controller may adjust an angle formed by the plurality of arms and a penetration cross section of the air intake pipe to thereby adjust a cross-sectional area in which the supplied air flows in the pipe, and the cross-sectional area may be proportional to a flow rate of air supplied to the cathode. The angle may be $$\cos^{-1}\left(1 - \frac{(\Delta m_{air}/\Delta t)_{target}}{(\Delta m_{air}/\Delta t)_{sensor}}\right),$$

wherein $m_{air}$ may be a flow rate of air, $(\Delta m_{air}/\Delta t)_{target}$ may be a target air flow rate required by the fuel cell stack, and $(\Delta m_{air}/\Delta t)_{sensor}$ may be a flow rate of air currently supplied to the fuel cell stack.

According to another exemplary embodiment of the present disclosure, a control method of a fuel cell system includes receiving an operating signal of an acceleration pedal and adjusting an opening of a valve based on the received operating signal, wherein the valve is provided in a pipe connected to an air intake of a fuel cell stack.

The step of adjusting may adjust the opening of the valve according to a ratio of a target air flow rate necessary for the fuel cell stack according to the received operating signal and a flow rate of air currently supplied to the fuel cell stack.

The method may further include detecting a current output from the fuel cell stack, wherein the step of adjusting may be performed in the case in which a output current value is smaller than a preset value, and an error between a rotation speed instruction value for an air supplier configured to supply air to the fuel cell stack and an actual rotation speed corresponding to the instruction value is larger than a preset error.

BRIEF DESCRIPTION OF THE DRAWINGS

FIG. 1 illustrates a power net configuration of a fuel cell system according to an exemplary embodiment of the present disclosure.

FIG. 2 describes graphs of an air super charging according to a repetition of tip-in and tip-out.

FIG. 3 is a graph showing a deflection of a current-voltage curve and degradation in an output performance caused by a dry out of a fuel cell stack.

FIG. 4 is a block diagram of a fuel cell system according to an exemplary embodiment of the present disclosure.

FIG. 5 is an enlarged conceptual view of an air intake pipe including an opening adjustable valve according to an exemplary embodiment of the present disclosure.

FIG. 6 shows graphs of an acceleration pedal sensor signal, and a valve angle and a flow rate of air in an air intake pipe according to a fuel cell system and a control method thereof according to an exemplary embodiment of present disclosure.

FIG. 7 is a flow chart showing a control method of a fuel cell system according to an exemplary embodiment of the present disclosure.

DETAILED DESCRIPTION

Specific descriptions on structure and function of embodiments of the present disclosure described herein are merely illustrative and not construed to limit the disclosure thereto.

Since the present disclosure may be variously modified and have several exemplary embodiments, specific exemplary embodiments will be shown in the accompanying drawings and be described in detail. However, it is to be understood that the present disclosure is not limited to the specific exemplary embodiments but includes all modifications, equivalents, and substitutions included in the spirit and the scope of the present disclosure.

Terms such as 'first', 'second', etc., may be used to describe various components, but the components are not to be construed as being limited to the terms. The terms are used only to distinguish one component from another component. For example, the 'first' component may be named the 'second' component, and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, should be similarly interpreted.

Terms used in the present specification are used only in order to describe specific exemplary embodiments rather than limiting the present disclosure. Singular forms used herein are intended to include plural forms unless explicitly indicated otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, preferred embodiments of the present disclosure will be described in detail with reference to the accompanying drawings. Like reference numerals denote like components throughout the drawings.

FIG. 1 is a power net configuration view of a fuel cell system according to an exemplary embodiment of the present disclosure.

Referring to FIG. 1, a fuel cell system 100 may include a fuel cell 10 which is a main power source and a high voltage battery (main battery) 20 which is an auxiliary power source, which are connected to each other in parallel through a main bus terminal 11. A bidirectional high voltage DC/DC converter (BHDC) 21 is connected to the high voltage battery 20 so as to control an output of the high voltage battery 20, and an inverter 31 is connected to the fuel cell 10 and the main bus terminal 11, which is an output side of the high voltage battery 20. A driving motor 32 is connected to the inverter 31, a high voltage electronic loads 33, and a low voltage battery (auxiliary battery) 40. A low voltage electronic load 41 in a vehicle, except for the inverter 31 and the driving motor 32, and a low voltage DC/DC converter (LDC) 42 are connected between the low voltage battery 40 and the main bus terminal 11 to thereby convert a high voltage into a low voltage.

The fuel cell 10 which is the main power source of the vehicle and the high voltage battery 20 used as the auxiliary power source are connected to the respective loads in the system such as the inverter 31 and the driving motor 32 in parallel through the main bus terminal 11. The bidirectional high voltage DC/DC converter 21 connected to the high voltage battery terminal is connected to the main bus terminal 11, which is the output side of the fuel cell 10, such that the output of the fuel cell 10 and the output of the high voltage battery 20 may be controlled by a control of a voltage (an output voltage to the main bus terminal) of the bidirectional high voltage DC/DC converter 21.

The fuel cell terminal is installed with a diode 13 to prevent a flow of a reverse current and a relay 14 to selectively connect the fuel cell 10 to the main bus terminal 11. The relay 14 maintains a connected state during a drive of the vehicle in which the fuel cell 10 is operated as well as in an idle stop and restart state of the fuel cell system and is disconnected only at the time of key off (a normal shutdown according to key off) or emergency shutdown of the vehicle.

In addition, the inverter 31 for rotating the driving motor 32 is connected to the fuel cell 10 and the output side of the high voltage battery 20 through the main bus terminal 11 to transform power supplied from the fuel cell 10 and/or the high voltage battery 20, thereby driving the driving motor 32.

The driving motor 32 is driven in a fuel cell mode solely using the output (current) of the fuel cell 10, an EV mode solely using the output of the high voltage battery 20, and a hybrid (HEV) mode in which the output of the fuel cell 10 is assisted by the output of the high voltage battery 20.

Particularly, in the case in which a predetermined idle stop condition is satisfied in the fuel cell system, an idle stop control stopping air supply to stop generating electricity from the fuel cell 10, and until the fuel cell 10 restarts to thereby drive the driving motor 32 at a normal output of the fuel cell 10, a drive of the EV mode solely using the output of the high voltage battery 20 is performed.

In the above-mentioned EV mode driving state, the voltage of the high voltage battery 20 is boosted by a boost control of the bidirectional high voltage DC/DC converter 21 connected to the high voltage battery terminal in a state in which the relay 14 is turned on and a state in which the electricity generation of the fuel cell 10 is stopped (the air supply is stopped), such that the loads in the vehicle such as the inverter 31, the driving motor 32, and the like are operated only by the output of the high voltage battery 20.

In addition, the air supply is stopped at the time of the idle stop of the fuel cell system as described above and is then resumed in the case in which the restart condition is satisfied to thereby restart the fuel cell. After the restart, when the fuel cell system returns to the normal driving mode, the output of the fuel cell 10 is again following-controlled (load following control) according to a vehicle load in a state in which the air is normally supplied and a boosting state of the bidirectional high voltage DC/DC converter 21 is released.

FIG. 2 is a graph describing an air super charging according to a repetition of tip-in and tip-out (i.e., pressing and releasing an acceleration pedal). As an acceleration pedal is pressed down over time, an acceleration pedal operating signal is detected from an acceleration pedal sensor, such that the current generated from the fuel cell stack is output.

Air is supplied from the air supplier in order to generate electricity from the fuel cell stack, and a supplied amount of air is controlled according to a rotation speed of the air supplier. When a motor controller of the air supplier transmits a rotation speed instruction for the rotation speed of the air supplier to the air supplier according to the signal from the acceleration pedal sensor, the rotation speed of the air supplier is adjusted according to the rotation speed instruction. However, an error is generated between the rotation speed instruction and the rotation speed of the air supplier. Since the rotation speed instruction is set based on a target flow rate, when the error is generated between an actual rotation speed and a rotation speed instruction value, more flow rate than the target flow rate is super charged to a cathode of the fuel cell stack to thereby cause a dry out at the fuel cell stack.

FIG. 3 is a graph showing a deflection of a current-voltage (I-V) curve and degradation in an output performance caused by a dry out of a fuel cell stack.

A horizontal axis represents a current of the fuel cell stack and a vertical axis represents a voltage of the fuel cell stack. It may be appreciated from the graph that in the case in which the tip-in and tip-out are repeatedly tested 30 times for 200 seconds, a level of the voltage decreased according to an increase in the current is larger. That is, in the case in which the tip-in and tip-out are repeated, as shown in FIG. 2, whenever the signal for the acceleration pedal operation sensed by the acceleration pedal sensor is sensed, the air super charging into the fuel cell stack is generated. Therefore, it may be appreciated that the fuel cell stack becomes dry, such that the voltage more quickly decreases as the current increases as compared to a normal case.

FIG. 4 is a block diagram of a fuel cell system 400 according to an exemplary embodiment of the present disclosure. FIG. 5 is an enlarged conceptual view of an air intake pipe including an opening adjustable valve according to an exemplary embodiment of the present disclosure.

Referring to FIGS. 4 and 5, the fuel cell system 400 according to an exemplary embodiment of the present disclosure may include a fuel cell stack 410, a valve 420, an air intake pipe 430, an air supplier 440, an acceleration pedal sensor (APS) 450, an acceleration pedal 455, a current sensor 460, and a controller 470.

The fuel cell stack 410 includes a cathode and an anode, and the air supplier 440 may supply air to a cathode side through the air intake pipe 430. The air intake pipe of the fuel cell stack 410 connecting the air supplier 440 and the cathode to each other may include an opening adjustable valve 420 thereto.

The valve 420, which is provided in the air intake pipe 430 connecting the air supplier 440 and an air intake of the fuel cell stack 410, may be a throttle valve and may include a plurality of arms 520 rotating based on a rotation shaft 510.

The controller 470 may adjust an opening of the valve 420 according to a ratio of a target air flow rate required by the fuel cell stack 410 and an air flow rate supplied to the fuel cell stack 410.

In addition, in the case in which a level of an acceleration pedal operating signal (APS signal) and a level of the current output from the fuel cell stack 410 are lower than a preset value and the error between the rotation speed instruction value for the air supplier 440 and the actual rotation speed corresponding to the instruction value is larger than a preset value, the controller 470 may adjust the opening of the valve 420 to thereby control a flow rate of air supplied to the fuel cell stack 410.

In this case, the controller 470 may rotate the rotation shaft 510 of the valve 420 to adjust the opening of the valve 420 through the plurality of arms 520.

Specifically, the controller 470 may adjust an angle θ formed by the plurality of arms 520 and a penetration cross section of the air intake pipe 430 to thereby adjust a cross-sectional area in which the air supplied from an inner portion of the pipe 430 may flow, wherein the cross-sectional area may be proportional to the flow rate of air supplied to the cathode.

When the plurality of arms 520 is rotated based on the rotation shaft 510, an angle θ formed by the arm 520 and the cross section penetrating through the air intake pipe 430 is $$\cos^{-1}\left(1 - \frac{(\Delta m_{air}/\Delta t)_{target}}{(\Delta m_{air}/\Delta t)_{sensor}}\right),$$

wherein $m_{air}$ is a flow rate of air, $(\Delta m_{air}/\Delta t)_{target}$ is a target air flow rate required by the fuel cell stack 410, and $(\Delta m_{air}/\Delta t)_{sensor}$ is a flow rat of air currently supplied to the fuel cell stack 410.

A cross-sectional area $A(\theta)$ in which the air may flow, having the angle θ formed by the arm 520 and the penetration cross section of the air intake pipe 430 as a variable, may be represented as $\pi R^2(1-\cos\theta)$, wherein R is a length of the arm 520 based on a shaft. Since the arm 520 is rotated based on the rotation shaft, R may be represented as a rotation radius of the arm 520 or a radius of the air intake pipe 430.

That is, the flow rate of air passing through the valve 420 and supplied to the air intake side of the fuel cell stack 410 is proportional to the cross-sectional area in which the air may flow. As an example, in the case in which θ is 90°, cos θ is 1, which means that the arm 520 configuring the valve 420 does not block air flowing through the air intake pipe 430. If θ is 0°, then the arm 520 blocks the air flow of the air intake pipe 430. In this case, the cross-sectional area in which the air may flow to the fuel cell stack 410 side may become 0.

FIG. 6 is a graph showing an acceleration pedal sensor signal, and a valve angle and a flow rate of air in an air intake pipe according to a fuel cell system and a control method thereof according to an exemplary embodiment of present disclosure.

Referring to FIGS. 4 to 6, amounts obtained by pressing down and releasing the acceleration pedal 455 by the tip-in and tip-out are different and are sensed by the acceleration pedal sensor 450, such that the acceleration pedal operating signal is generated. When the pressed amount of the acceleration pedal is large, the angle is maintained to be adjacent to 90°. When the pressed amount of the acceleration pedal is smaller than a preset value, the controller 470 instructs the value to make the angle thereof about 40°, such that the angle is adjusted accordingly. When the acceleration pedal operating signal is not sensed, the air supplied to the fuel cell stack 410 needs to be blocked, and the controller 470 sets this blocked air as a target flow rate to thereby control the flow rate. At the time of the control according to the related art, in the case in which the acceleration pedal operating signal is not sensed, even though the target flow rate is rapidly decreased, the related art does not follow the decreased target flow rate, such that the air was actually super charged to the fuel cell stack 410. Therefore, the fuel cell stack 410 may be dried out. However, according to an exemplary embodiment of the present disclosure, it may be appreciated that the air flow rate supplied to the fuel cell stack 410 nearly follows the target air flow rate by controlling an angle of the throttle valve 420 using the ratio of the target air flow rate and the actual air flow rate. In the case in which the air flow rate reaches the target air flow rate, the controller 470 returns the throttle valve 420 to an original state to maintain an electricity generation prepare state, thus to receive the acceleration pedal operating signal.

FIG. 7 is a flow chart showing a control method of a fuel cell system according to an exemplary embodiment of the present disclosure.

Referring to FIGS. 4, 5, and 7, when the APS 450 senses an operation of the acceleration pedal 455, the controller 470 receives an operating signal of the acceleration pedal 455 from the APS 450 and determines whether a level of the received operating signal is smaller than a preset value (S701). In the case in which the level of the operating signal of the acceleration pedal 455 is smaller than the preset value, the controller 470 again determines whether the current output from the fuel cell stack 410 is smaller than the preset value (S703). In the case in which the level of the operating signal of the acceleration pedal 455 is larger than the preset value, since air needs to be continuously supplied to the fuel cell stack 410, the controller 470 determines whether the level of the continuously received operating signal is smaller than the preset value.

In the case in which the current sensor 460 senses the current output from the fuel cell stack 410, the controller 470 determines whether the sensed output current is smaller than the preset value using the sensed output current (S703). In the case in which the current output from the fuel cell stack 410 is smaller than the preset value, the controller 470 determines whether a difference between a rotation speed according to a rotation speed instruction of the air supplier 440 and an actual rotation speed of the air supplier 440 is larger than a preset error (S705). In the case in which the current output from the fuel cell stack 410 is smaller than the preset value, the air supply needs to be blocked. Since a load current is smaller than the preset value, the fuel cell stack 410 stops generating the electricity. In the case in which the current output from the fuel cell stack 410 is larger than the preset value, since the current to be output by the fuel cell stack 410 is required, the air supply is maintained, and it is determined whether the current continuously output from the fuel cell stack 410 is smaller than the preset value.

In the case in which the difference between the rotation speed according to the rotation speed instruction of the air supplier 440 and the actual rotation speed of the air supplier 440 is larger than the preset error, the controller 470 may adjust an opening of the valve 420 according to a ratio of a target air flow rate required by the fuel cell stack 410 and an air flow rate currently supplied to the fuel cell stack 410 from the air supplying device 440. As described with reference to FIG. 2, the rotation speed instruction of the air supplier is specifically transferred from a motor controller of the air supplier to the air supplier to control the rotation speed of the air supplier. In addition, the air flow rate supplied to the fuel cell stack 410 may be adjusted by the rotation speed instruction of the air supplier as described above. However, in the case in which there is a large difference between the actual rotation speed of the air supplier 440 and the instruction, the difference needs to be adjusted. Referring to FIG. 6, the target air flow rate is determined according to the rotation speed instruction of the air supplier, wherein even though the target air flow rate to be supplied is set to be low by transfer of a rotation stop instruction of the air supplying device, the actually supplied air flow rate may not follow the rotation stop instruction, such that more air is super charged.

The valve 420 provided in the air intake pipe 430 has an arm rotating based on a shaft, and the controller 470 may rotate the shaft 510 to adjust the opening of the valve 420. Here, a cross-sectional area in which the air flows may be adjusted in the pipe 430 by adjusting an angle formed by the arm 520 provided in the valve 420 and a penetration cross section of the air intake pipe 430, wherein, the cross-sectional area is proportional to the flow rate of air supplied to the fuel cell stack 410.

The angle formed by the arm 520 provided in the valve 420 and the penetration cross section of the air intake pipe 430 may be calculated as, $$\cos^{-1}\left(1 - \frac{(\Delta m_{air}/\Delta t)_{target}}{(\Delta m_{air}/\Delta t)_{sensor}}\right),$$

wherein $m_{air}$ is the flow rate of air, $(\Delta m_{air}/\Delta t)_{target}$ is the target air flow rate required by the fuel cell stack 410, and $(\Delta m_{air}/\Delta t)_{sensor}$ is the flow rate of air currently supplied to the fuel cell stack 410.

The fuel cell system and the control method thereof according to the exemplary embodiments of the present disclosure prevents the air supercharging in a driving mode requiring frequent deceleration and acceleration, such as driving on the clogged city road, to prevent the dry out of the fuel cell stack, thereby improving durability of the fuel cell.

Although the embodiments of the present disclosure have been described in detail, they are only examples. It will be appreciated by those skilled in the art that various modifications and equivalent other embodiments are possible from the present disclosure. Accordingly, the actual technical protection scope of the present disclosure must be determined by the spirit of the appended claims.

What is claimed is:

1. A fuel cell system, comprising:
a fuel cell stack including a cathode and an anode;
an air supplier configured to supply air to the cathode;
an air intake pipe connecting an outlet of the air supplier and an inlet of the cathode to each other and having an opening adjustable valve provided thereto; and
a controller configured to adjust an opening of the valve according to a supplied amount of air to control an air flow rate supplied to the cathode,
wherein the controller adjusts the opening of the valve to control the flow rate of the supplied air in the case in which a level of an operating signal and a level of a current output from the fuel cell stack are lower than a preset value, and an error between a rotation speed instruction value for the air supplier and an actual rotation speed corresponding to the instruction value is larger than a preset error, and
wherein the controller adjusts the opening of the valve according to a ratio of a target air flow rate necessary for the fuel cell stack and the air flow rate supplied to the fuel cell stack.

2. The fuel cell system according to claim 1, wherein the valve includes a plurality of arms rotating based on a shaft, and
the controller rotates the shaft to adjust the opening of the valve through the plurality of arms.

3. The fuel cell system according to claim 2, wherein the controller adjusts an angle formed by the plurality of arms and a penetration cross section of the air intake pipe to adjust a cross-sectional area in which the supplied air flows in the pipe, the cross-sectional area being proportional to the flow rate of the air supplied to the cathode.

4. The fuel cell system according to claim 3, wherein the angle is $$\cos^{-1}\left(1 - \frac{(\Delta m_{air}/\Delta t)_{target}}{(\Delta m_{air}/\Delta t)_{sensor}}\right),$$

$m_{air}$ being a flow rate of air, $(\Delta m_{air}/\Delta t)_{target}$ being a target air flow rate required by the fuel cell stack, and $(\Delta m_{air}/\Delta t)_{supplied}$ being a flow rate of air currently supplied to the fuel cell stack.

* * * * *